United States Patent [19]

Holka

[11] Patent Number: 5,197,561

[45] Date of Patent: Mar. 30, 1993

[54] OFFSET STEERING GEAR ASSEMBLY

[75] Inventor: Thomas C. Holka, Milford, Mich.

[73] Assignee: Ford Motor Company, Dearborn, Mich.

[21] Appl. No.: 802,805

[22] Filed: Nov. 12, 1991

Related U.S. Application Data

[62] Division of Ser. No. 594,903, Oct. 9, 1990, Pat. No. 5,082,077.

[51] Int. Cl.⁵ .............................................. B62D 3/12
[52] U.S. Cl. ................................ 180/79.3; 74/422; 74/498; 180/151; 280/95.1; 280/96
[58] Field of Search ............... 180/79.3, 151; 280/91, 280/95.1, 96; 74/422, 498

[56] References Cited

U.S. PATENT DOCUMENTS

| 3,633,933 | 1/1972 | Millard | 280/96 |
| 4,630,701 | 12/1986 | Venetjoki | 280/96 |
| 5,082,077 | 1/1992 | Holka | 180/79.3 |

FOREIGN PATENT DOCUMENTS

| 352185 | 1/1990 | France . | |
| 1235155 | 6/1971 | United Kingdom | 74/498 |
| 2001409 | 1/1979 | United Kingdom . | |

Primary Examiner—Mitchell J. Hill
Attorney, Agent, or Firm—Raymond L. Coppiellie; Roger L. May

[57] ABSTRACT

The steering system for use in an automotive vehicle includes a pinion gear operatively connected to a steering wheel, an elongate rack member meshingly engaging the steering pinion gear and operative to move reciprocally in response to rotation of the steering wheel, a rack housing reciprocally supporting the rack member and a tie rod connected to the road wheel of the vehicle. The system further includes a lever means, such as an articulated link, pivotally mounted to the rack housing and directly drivingly engageable with the tie rod to effect reciprocal movement thereof in response to reciprocal movement of the rack member. In another embodiment, a spur gear is interposed between gear teeth disposed on the rack member and on the tie rod so that reciprocal movement of the rack member rotates the pinion gear resulting in simultaneous reciprocal movement of the tie rod.

8 Claims, 2 Drawing Sheets

OFFSET STEERING GEAR ASSEMBLY

This application is a division of application Ser. No. 07/594,903, filed Oct. 9, 1990, issued as U.S. Pat. No. 5,082,077 on Jan. 21, 1992.

BACKGROUND OF THE INVENTION

1. Field of the Invention

The present invention relates generally to an automotive steering system having a steering gear assembly connected to tie rods associated with the road wheels of the vehicle. More specifically, the present invention relates to an automotive steering system wherein the tie rods of the system are generally offset from the rack member of the steering gear.

2. Disclosure Information

With the advent of front wheel drive vehicles, smaller vehicles and various engine designs, the amount of space in the front end of an automotive vehicle is limited. It is becoming increasingly difficult to design vehicle bodies and engine compartments so that one vehicle component does not interfere with the placement and/or operation of another component. For example, the preferred location of a tie rod connected to a steerable wheel is approximately in the center of the lower "A" arm of the vehicle body to give the tie rod optimal room to move during jounce and rebound movement of the wheel. In this way, jarring impact of the tie rod against the vehicle frame can be avoided. However, it is often difficult to achieve this design due to the location of other vehicle components such as the starter, transmission and the like.

Given the ever crowding conditions present in the front end of vehicles today, it is becoming increasingly difficult to place the steering gear assembly in the vehicle to achieve the above goal. One solution to this problem is proposed in U.S. Pat. No. 4,887,683. The '683 patent utilizes a "bridge member" fastened below the rack member which moves reciprocally as the rack reciprocates in response to turning of the vehicle steering wheel. One end of each tie rod is connected to the bridge member so that as the bridge member reciprocates, the wheels turn. Although not disclosed as a solution to the above problem, the '683 system could be utilized to design the steering gear around other vehicle components located within the front end of the vehicle.

The present invention addresses the above problem of placing the steering gear in the vehicle in a location to maximize the available space for the tie rod by providing a steering system wherein the tie rods are offset from the steering gear. It is a feature of the present invention that one steering gear can be used in many vehicle applications by offsetting the tie rods from the steering gear rack member using different connecting devices.

It is an object of the present invention to provide a steering system for a vehicle wherein the tie rods are pivotally mounted to the end of the steering gear rack member by a lever device so that reciprocal movement of the rack member causes simultaneous reciprocal movement of the tie rod through the lever device.

It is a further object of the present invention to provide a steering system for a vehicle wherein the tie rods meshingly engage the end of the steering gear rack member by a gear device so that reciprocal movement of the rack member causes simultaneous reciprocal movement of the tie rod.

These and other objects and advantages of the present invention will become apparent from the summary, drawings, description and claims which follow.

SUMMARY OF THE INVENTION

There is disclosed herein a steering system for use in a vehicle comprising a opinion gear operatively connected to a steering wheel through a linkage, an elongate rack member meshingly engageable with the steering pinion gear and operative to move reciprocally in response to rotation of the steering wheel. The system further comprises a rack housing supporting the rack member, a tie rod operatively associated with a road wheel of the vehicle and lever means pivotally mounted to said rack housing for directly engaging the tie rod to effect reciprocal movement of the tie rod in response to reciprocal movement of the rack member. In one embodiment of the present invention, the lever means comprises an articulated link pivotally interconnecting the tie rod, the rack housing and the rack member. The articulated link is pivotally connected to the rack member at a point disposed between the rack housing and the tie rod. In an alternative embodiment, the link is pivotally connected to the rack housing at a point disposed between the rack member and the tie rod.

The link of the present invention includes a Y-shaped member having at least one bushing disposed between the arms of the Y-shaped member. The member includes at least three apertures for receiving fastening devices therethrough and about which the linkage pivots. At least one of these apertures is slotted to prevent binding of the link during operation.

In another embodiment of the present invention, the elongated rack member includes a plurality of gear teeth disposed at an end of the rack. The tie rod also includes a plurality of gear teeth generally opposite the gear teeth disposed at the end of the rack. A gear means, such as a spur gear, meshingly engages with the rack member and the tie rod to effect reciprocal movement of the tie rod in response to reciprocal of the rack member. The spur gear is interposed between the plurality of rack member gear teeth and the plurality of tie rod gear teeth so that reciprocal movement of the rack member causes the spur gear to rotate resulting in reciprocal movement of a tie rod and effectively steering the road wheels of the vehicle.

In an alternative embodiment of this invention, the rack member includes an additional set of gear teeth disposed at an axial end thereof and on the side of the rack opposite the gear teeth which meshingly engage with the steering pinion. The gear means of this embodiment comprises a pivotally mounted sector having a plurality of gear teeth disposed at one end thereof which meshingly engage with the additional rack member gear teeth disposed at one end of the rack member. The sector is pivotally connected to the tie rod at the end of the gear teeth so that reciprocal movement of the rack causes the sector to pivot and thus causing the tie rod to move reciprocally in response to the movement of the rack member.

DETAILED DESCRIPTION OF A PREFERRED EMBODIMENT

Figure 1:
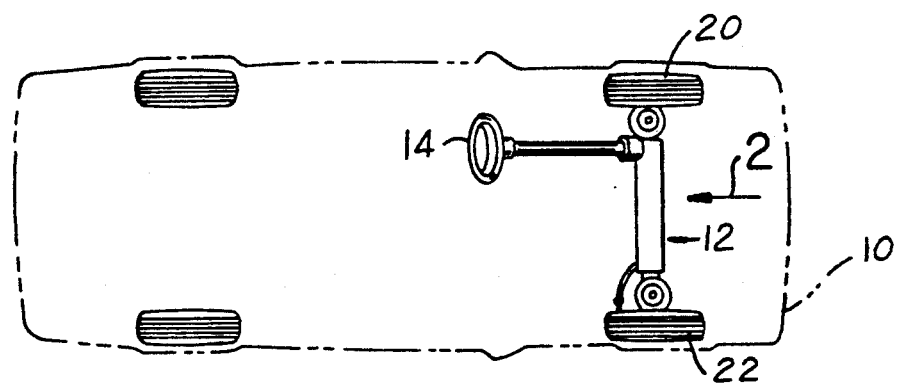
FIG. 1 is a plan view of an automotive vehicle employing a steering system of the present invention.
Figure 2:
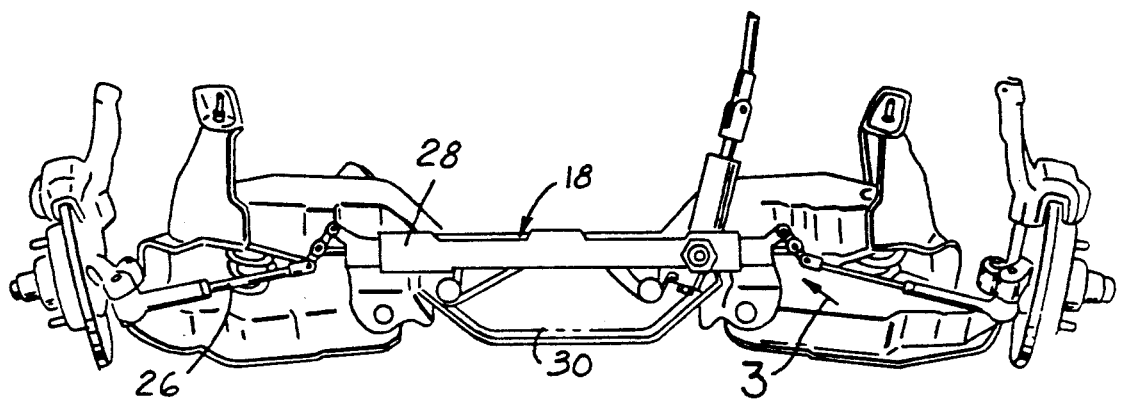
FIG. 2 is a perspective view of a portion of the front end of the vehicle of FIG. 1.

Referring now to the drawings, as shown in FIGS. 1 and 2, a vehicle 10 includes a steering system 12 having a steering wheel 14 and a steering column assembly 16. The steering system 12 further includes a steering gear 18 connected to the steerable road wheels 20, 22 by a pair of tie rods 24, 26. The steering gear assembly 18 is of a known type and includes a rack housing 28 connected to the vehicle frame or body 30. The vehicle 10 has longitudinal central axis as shown by line 2 in FIG. 1.

Figure 3:
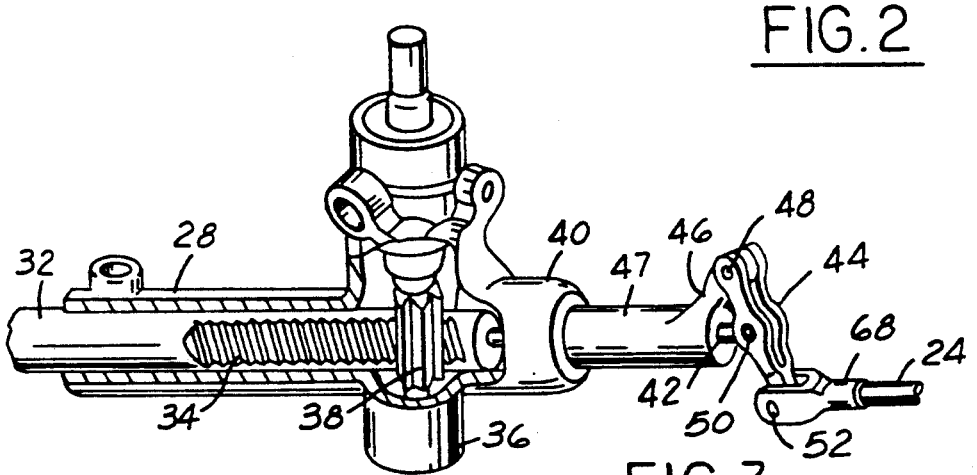
FIG. 3 is an enlarged perspective view of the steering gear assembly of FIG. 2 structured in accord with the principles of the present invention.

As shown in FIG. 3, an elongated rack member 32 is located in the rack housing 28 and reciprocates therein in a direction generally perpendicular to longitudinal central axis of the vehicle. The rack member 32 includes a plurality of rack gear teeth 34 which meshingly engage a steering pinion gear 38. The steering pinion gear 38 is housed in pinion housing 36 and is connected to the steering wheel 14 through a connecting link. The pinion gear 38 meshingly engages the rack teeth 34 formed upon rack member 32. Upon relative rotation of the steering wheel 14 and the pinion gear 38, the rack member 32 reciprocates axially within the rack housing 28.

For ease and clarity of description, the present invention will being described solely with reference to one side of the steering gear assembly. It is to be understood that the present invention may also be employed on both ends of the rack member 32 of steering gear 18. At an axial end 40 of steering gear assembly 18, the rack housing 28 includes an extension 47 having a projecting arm member 46 extending therefrom. Arm member 46 may be formed integrally with extension 47 during the fabrication of rack housing 28 and extension 47 or may secured thereto by any of a number of joining processes, such as welding or brazing. An end 42 of the rack member 32 extends through an aperture disposed at an axial end of rack housing extension 47. The axial end 42 of the rack member 32 is connected to the tie rod 24 by a lever means, such as shown by an articulated link 44 in FIGS. 3–5.

Figure 4:
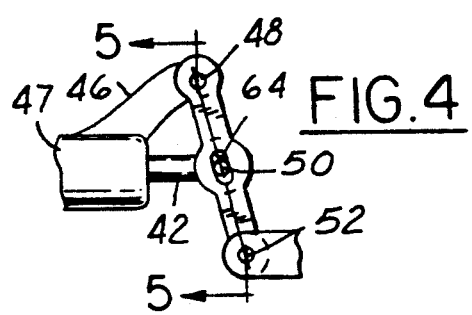
FIG. 4 is a side elevational view of a portion of the steering gear of FIG. 3.

Articulated link 44 pivotally interconnects the end 42 of rack member 32 to the tie rod 24 at three pivot points 48, 50, 52. The link 44 is pivotally connected to tie rod 24 at pivot point 52 and pivotally connected to the arm member 46 of extension 47 at pivot point 48. In the embodiment shown in FIGS. 3–5, the link 44 is pivotally connected to rack 32 at a point 50 on link 44 disposed between the pivot connection 48 and the pivot connection 52. In this manner, reciprocal movement of rack 32 causes link 44 to pivot, resulting in simultaneous reciprocal movement of tie rod 24 and movement of the steerable road wheels 20, 22. As can be seen in FIG. 4, this embodiment is preferred when it becomes necessary to place the steering pinion gear 38 on top of the rack member 32 to allow the wheels 20, 22 to be turned in the same direction as the steering wheel. Furthermore, the amount of longitudinal movement of tie rod 24 depends on the relative lengths of the link 44 between pivot points 48 and 50 and pivot points 50 and 52. If the length between points 48 and 50 is equal to the length between points 50 and 52, the amount of longitudinal movement of tie rod 24 will be double the amount of longitudinal movement of rack member 32. For example, one inch of travel of rack member 32 results in two inches of travel of tie rod 24. As will be readily apparent to those skilled in the art, mechanical adjustment of the lengths of the link 44 between the pivots points and the location of the pivot points determines the magnitude of movement of the tie rod relative to the rack member. Varying the lengths of link 44 between the pivot points allows flexibility in placing the steering gear in different locations within the vehicle to design around other vehicle components.

Figure 5:
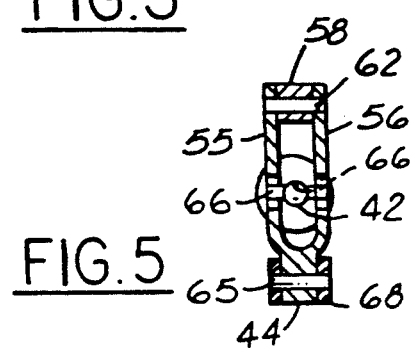
FIG. 5 is a front elevational view of FIG. 4 taken along line 5—5.

As shown in FIG. 5, the link 44 comprises a Y-shaped member pivotally connecting the rack member 32 to tie rod clevis 68 at points 48, 50 and 52. Interposed between the arms 55 and 56 of the Y-shaped link 44 are an upper bushing 58 and an intermediate bushing 60. Fastening devices (not shown) pass through apertures 62, 65 to secure the link 44 to the rack housing and clevis 68. A third aperture 64 is a slotted aperture at pivot point 50 for receiving a tab 66 disposed on the end of rack member 42. The tab slides axially within slotted aperture 64 to prevent binding of the assembly during reciprocal movements of the rack member 32 and tie rod 24. The tie rod 24 is connected to the articulated link at pivot point 52 by means of clevis 68. A fastening device, such as a threaded rod fastener (not shown) passes through each side of the clevis 68 and through aperture 65 to pivotally fasten tie rod 24 to articulated link 44. It should readily be apparent to one skilled in the art that tie rod may be fastened to link 44 in various other known methods For example, tie rod 24 may be interposed between a pair of separate, individual side plates and secured therein by means of a threaded rod fastener. In this manner,-the longitudinal movement of the tie rod 24 is generally parallel to but offset from the longitudinal movement of the rack member 32. In this way, should it be necessary for the tie rod to be offset from the steering gear due to structural components of the vehicle frame or the design locations of other vehicle components, such as a transmission, it will be possible to steer the road wheels by having the tie rods be offset from the steering gear assembly. As a result, a single steering gear assembly may be used in a variety of vehicle configurations with the tie rod being offset from the steering gear rack member by an articulated link of varying configurations.

Figure 6:
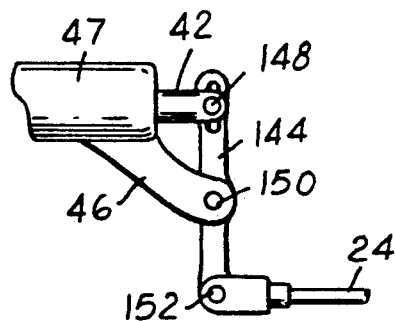
FIG. 6 is a side elevational view of a portion of a second embodiment of a steering gear structured in accord with the principles of the present invention.

FIG. 6 shows an alternative embodiment of a lever means of the present invention, structured similarly to that shown in FIGS. 3–5 and for use with a steering gear 18 as described above. In FIG. 6, the steering pinion is disposed on the opposite side of the rack member as that shown in FIG. 4. As before, link 144 pivotally interconnects the tie rod to the rack member so that reciprocal movement of the rack member results in the simultaneous reciprocal movement of the tie rod. To insure that road wheels 20, 22 turn in the same direction as the rotation of the steering wheel of the vehicle, it is necessary to pivotally connect the end 42 of the rack member at pivot point 148 of link 144. Link 144 pivotally connects the tie rod at point 152, arm member 46 of rack housing extension 47 at point 150 and rack member 42 at point 148. The construction of link 144 is generally similar to that described above in FIG. 5 for link 44 so a detailed description of link 144 is not necessary. However, the amount of longitudinal movement of the tie rod depends on the relative lengths of the link 144 between pivot points 148 and 150 and pivot points 150 and 152. If the length between points 148 and 150 is equal to the length between points 150 and 152, the amount of longitudinal movement of the tie rod will be equal to the amount of longitudinal movement of the rack member. For example, one inch of travel of the rack member results in one inch of travel of the tie rod. Again, mechanical adjustment of the lengths of the link 44 between the pivots points and the location of the pivot points determines the magnitude of movement of the tie rod relative to the rack member.

Figure 7:
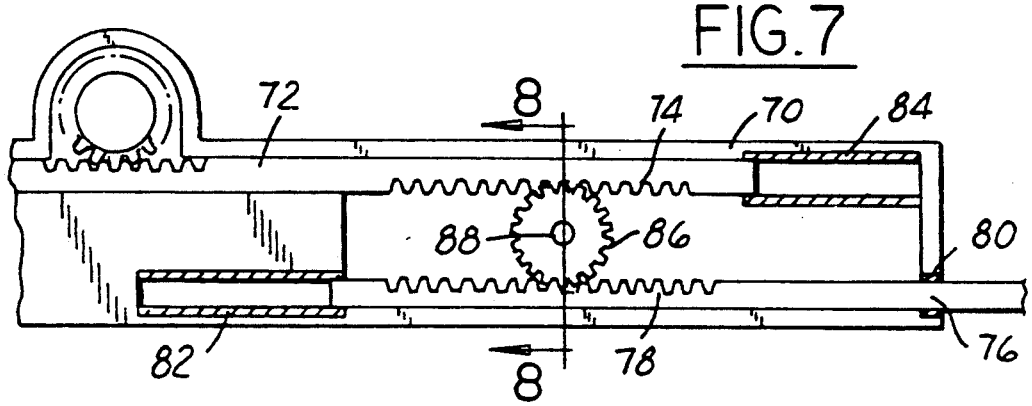
FIG. 7 is a cross sectional view of another embodiment of a steering gear structured in accord with the principles of the present invention.
Figure 8:
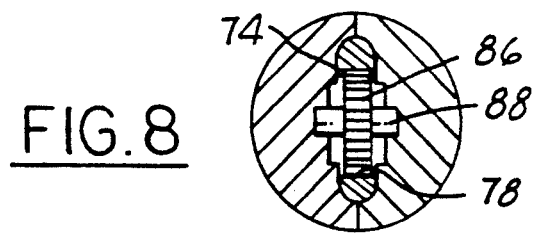
FIG. 8 is a cross sectional view of the steering gear of FIG. 7 taken along line 8—8.
Figure 9:
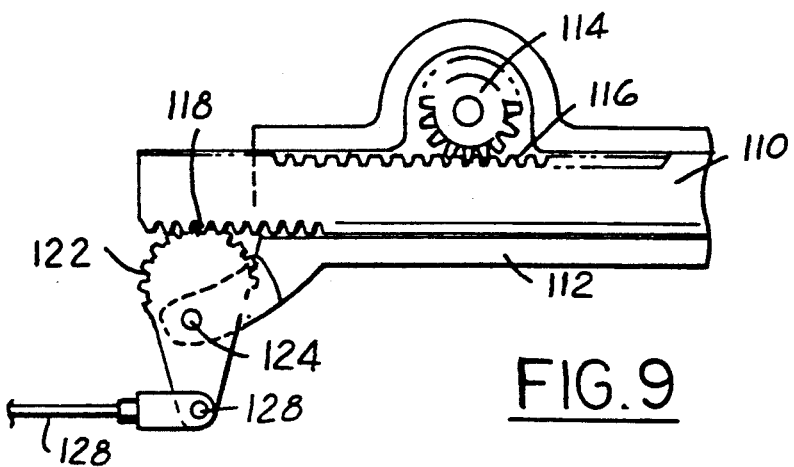
FIG. 9 is a cross sectional view of a third embodiment of a steering gear structured in accord with the principles of the present invention.

Another embodiment of a steering gear assembly having a tie rod offset from the rack member is shown in FIGS. 7-9. As before, only one side of the steering gear will be described, it being understood that the present invention may be used on both sides of the steering gear. In FIG. 7, the rack member 72 and tie rod 76 are enclosed within housing 70 and both move reciprocally within housing 70. The rack member 72 includes an additional set of gear teeth 74, separated from the gear teeth which meshingly engage the steering pinion gear, disposed at an axial end thereof. The tie rod 76 also includes a plurality of gear teeth 78 disposed generally opposite from the additional set of gear teeth 74 of rack member 72. The tie rod 76 slides reciprocally within housing 70 through a bushing 80 disposed at an aperture located at one end of housing 70. The tie rod 76 can be secured within housing by bearings 82 which allows tie rod 76 to move reciprocally therein. The rack 72 also is secured within housing 70 by means of bearings 84 which allow rack 72 to reciprocate within housing 70.

A gear means, such as spur gear 86, meshingly engages the rack member 72 and tie rod 76 to effect reciprocal movement of the tie rod 76 in response to reciprocal movement of the rack member 72. Spur gear 86 meshingly engages both the additional gear teeth 74 of rack 72 and the gear teeth 78 of tie rod 76 so that reciprocal movement of rack 72 causes spur gear 86 to rotate, resulting in reciprocal movement of tie rod 76 and steering of the steerable wheels connected to tie rod 76. The amount of offset of the tie rod 76 from the rack member 72 is dependent upon the diameter of spur gear 86. The diameter of spur gear 86 will be determined by the design or the configuration of the vehicle and the need to offset the tie rod to avoid other vehicle components.

FIG. 8 shows a cross sectional view of the embodiment of FIG. 7. In this embodiment, the spur gear 86 has a set of gear teeth 88 which meshingly engage the additional gear teeth 74 of rack 72 and the gear teeth 78 of tie rod 76. It will be apparent to those of skill in the art that the spur gear 86 may have a variety of configurations and the present invention is not meant to be limited solely to the embodiment described herein.

FIG. 9 shows a second embodiment of a steering gear having a gear means meshingly engageable with the rack member 110 and the tie rod 126 to effect reciprocal movement of the tie rod in response to reciprocal movement of the rack member. As before, a steering pinion gear 114 meshingly engages the gear teeth 116 of rack 110. The rack member 110 further includes an additional set of gear teeth 118 disposed at an axial end thereof on a side generally opposite the steering gear teeth 116 which engage the steering pinion gear 114. The additional gear teeth 118 meshingly engage with a plurality of gear teeth 122 disposed upon a pivotally mounted sector 120. The sector 120 is pivotally connected to housing 112 at a pivot 124 and pivotally connects tie rod 126 at a point 128. In this manner, reciprocal movement of rack member 110 causes the sector 120 to rotate resulting in reciprocal movement of tie rod 126. The longitudinal movement of tie rod 126 is generally parallel to but generally offset from the longitudinal movement of rack 110. Thus as a rack moves reciprocally, the sector will be pivoted and a tie rod will be moved reciprocally in a simultaneous manner with a magnitude of movement of the tie rod depending upon the length of sector 120. The length of sector 120 will be determined by the design needs of the vehicle as discussed above.

In light of the foregoing, it should be apparent that many variations are possible within the scope of the present invention. For example, the present invention has been described for use in a conventional rack and pinion type steering gear, but also can be used in different steering gears as well. The present invention also may be used on a steering gear used to steer the rear wheels of a vehicle. Accordingly, the foregoing drawings, discussion and description are merely meant to be illustrative of particular embodiments of the invention and not limitations upon the practice thereof. It is the following claims, including all equivalents, which define the scope of the invention.

What is claimed is:

1. A steering system for use in a vehicle comprising:
    a pinion gear operatively connected to a steering wheel through a linkage;
    an elongate rack member operative to meshingly engage said pinion gear and move reciprocally in response to rotation of said steering wheel;
    a rack housing for a supporting a said rack member for reciprocal movement therein;
    a pair of tie rods, each one of said pair being operatively associated with a steerable road wheel of said vehicle; and
    gear means meshingly engageable with said rack member and directly drivingly engageable with said tie rod to effect reciprocal movement thereof in response to reciprocal movement of said rack member, said gear means comprising a pair of articulated gears, each one of said pair of articulated gears being associated with each one of said pair of tie rods, and each one of said pair of articulated gears being pivotally attached to said rack housing between said rack member and said tie rod.

2. A steering system according to claim 1, wherein said rack member includes a plurality of gear teeth disposed on at least one side thereof and each one of said pair of tie rods includes a plurality of gear teeth at an end proximate said rack member.

3. A steering system according to claim 2, wherein said gear means comprises a pair of spur gears interposed between said plurality of rack member gear teeth and said plurality of tie rod gear teeth so that reciprocal movement of said rack member causes said pair of spur gears to rotate resulting in reciprocal movement of said pair of tie rods.

4. A steering system according to claim 2, wherein said plurality of rack member gear teeth are disposed on said rack member on a side of said rack member opposite said steering pinion gear.

5. A steering system according to claim 1, wherein said rack member further includes a plurality of gear teeth disposed on said rack member at an axial end thereof on a side of said rack member opposite said steering pinion gear.

6. A steering system according to claim 1, wherein said gear means comprises a pair of pivotally mounted sectors, each one having a plurality of gear teeth disposed on a first end, said sector teeth being adapted to meshingly engage said rack member gear teeth, each one of said pair of sectors being pivotally connected to each one of said pair of tie rods at an end of said sector opposite said first end.

7. A steering system for use in a vehicle, comprising:
a pinion gear operatively connected to a steering wheel through a linkage;
an elongate rack member having a plurality of gear teeth disposed on at least one side thereof operative to meshingly engage said pinion gear and move reciprocally in a direction generally perpendicular to the longitudinal axis of said vehicle in response to rotation of said steering wheel;
a rack housing for supporting said rack member for reciprocal movement therein;
a pair of tie rods having a plurality of gear teeth at an end proximate said rack member, each one of said pair being operatively associated with a steerable road wheel of said vehicle; and
gear means meshingly engageable with said rack member and directly drivingly engageable with said tie rod to effect reciprocal movement thereof in response to reciprocal movement of said rack member, said gear means comprising a pair of spur gears interposed between said plurality of rack member gear teeth and said plurality of tie rod gear teeth, and each one of said pair of spur gears being pivotally attached to said rack housing between said rack member and said tie rod so that reciprocal movement of said rack member causes said pair of spur gears to rotate resulting in reciprocal movement of said pair of tie rods.

8. A steering system for use in a vehicle, comprising:
a pinion gear operatively connected to a steering wheel through a linkage;
an elongate rack member having a plurality of gear teeth disposed on said rack member at an axial end thereof on a side of said rack member opposite said steering pinion gear operative to meshingly engage said pinion gear and move reciprocally in a direction generally perpendicular to the longitudinal axis of said vehicle in response to rotation of said steering wheel;
a rack housing for supporting said rack member for reciprocal movement therein;
a pair of tie rods, each one of said pair being operatively associated with a steerable road wheel of said vehicle; and
gear means meshingly engageable with said rack member and directly drivingly engageable with said tie rod to effect reciprocal movement thereof in response to reciprocal movement of said rack member, said gear means comprising a pair of pivotally mounted sectors, each one having a plurality of gear teeth disposed on a first end, said second gear teeth being adapted to meshingly engage said rack member gear teeth on a side of said rack member opposite said steering pinion gear, each one of said pair of sectors being pivotally connected to each one of said pair of tie rods at an end of said sector opposite said first end, and each one of said pair of sectors being pivotally attached to said rack housing between said rack member and said tie rod.

* * * * *